Jan. 23, 1968    G. S. FOERSTER    3,364,707
EXTRUSION FORMING MEMBER AND METHOD
Filed Feb. 16, 1965    2 Sheets-Sheet 1
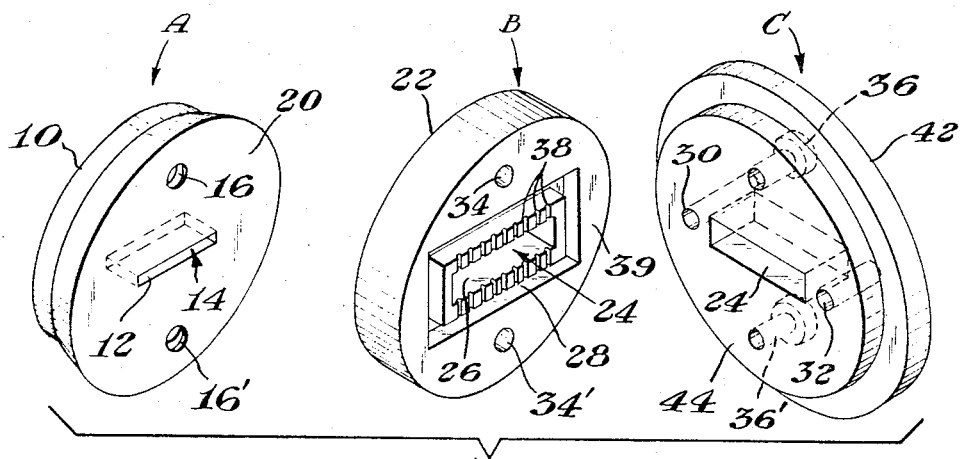
Fig. 1
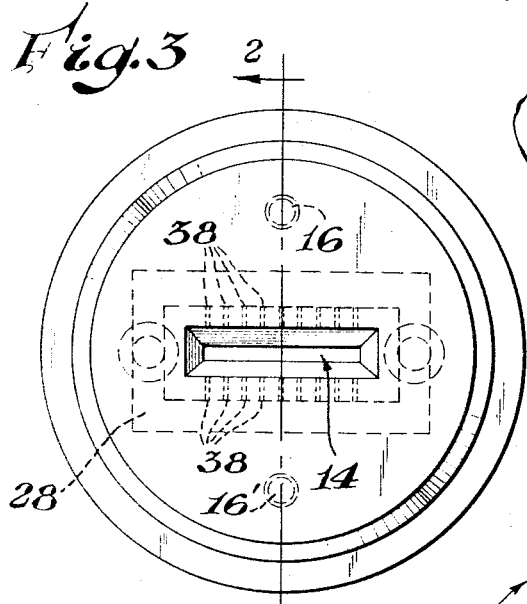
Fig. 3
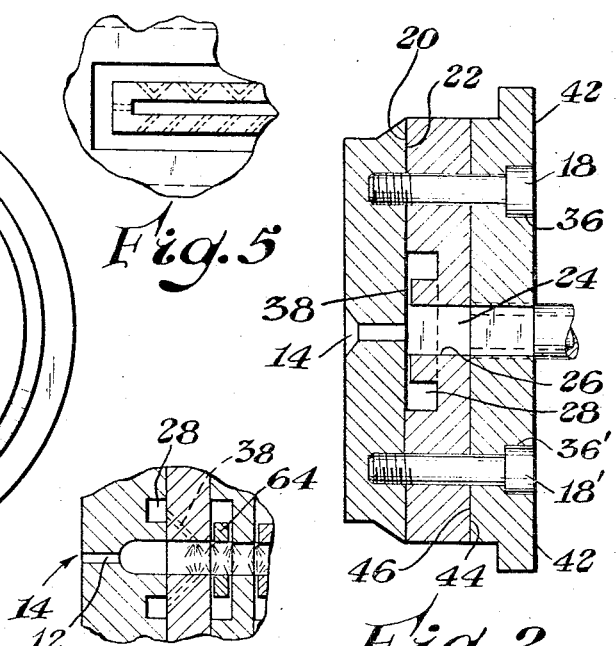
Fig. 5
Fig. 2
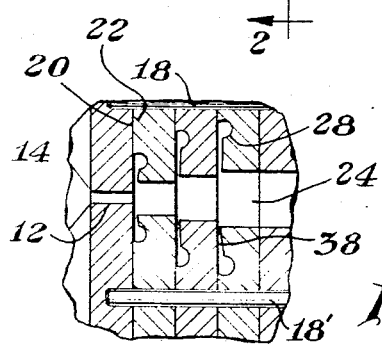
Fig. 6
Fig. 4
INVENTOR.
George S. Foerster
BY John M. DeMaeste
ATTORNEY Jan. 23, 1968  G. S. FOERSTER  3,364,707
EXTRUSION FORMING MEMBER AND METHOD
Filed Feb. 16, 1965  2 Sheets-Sheet 2

INVENTOR.
George S. Foerster
BY *(signature)*
ATTORNEY

United States Patent Office 3,364,707
Patented Jan. 23, 1968

3,364,707
EXTRUSION FORMING MEMBER AND METHOD
George S. Foerster, Midland, Mich., assignor to The Dow Chemical Company, Midland, Mich., a corporation of Delaware
Filed Feb. 16, 1965, Ser. No. 432,977
16 Claims. (Cl. 72—38)

ABSTRACT OF THE DISCLOSURE

This invention concerns an extrusion forming apparatus member and method of extruding. The apparatus comprises an assembly having die lands defining an extrusion aperture partially longitudinally therethrough, a cavity longitudinally adjacent and in relief from said aperture, at least one cooling channel disposed about said cavity in a spaced relationship thereto and also spaced from said aperture, inlet and outlet means for said channel; and at least one stage of an array of relatively small passageways disposed about the cavity communicating said cavity with said channel adjacent to the die lands. The method comprises confining the alloy in a container of an extrusion machine containing said forming member, extruding the confined metal through the forming member at an elevated temperature while circulating coolant through the channel and passageways and bleeding off at least a portion of the coolant from the channel through said passageways.

---

When extruding, for example, magnesium, aluminum and zinc alloys, quenching at the die land using conventional dies and with separate quenching apparatus is impractical if not impossible, because the die land and/or forming surfaces thereof must be well supported to prevent binding and die breakage. Thus, the opening constituting the extrusion aperture, the relief cavity and also the opening in the die backer in support thereof cannot be much larger than the extrusion aperture itself. Though in certain cases the opening in the header portion of the extrusion press, in which these are placed, may be large enough to permit insertion of a separate quenching apparatus or chamber if the extrude is not too wide, this is not possible where the extrude is very wide. Therefore, the quenching apparatus must generally be placed beyond the opening or neck in the header block. Accordingly, in extruding this is normally where conventional quenching of for example, magnesium, and other metals is performed. As a result, the quenching action usually occurs relatively remote from the die, such as, for example, from about 4 to about 36 inches therefrom. Inasmuch as recrystallization and/or grain growth begin to occur immediately as the extrude leaves the die lands, a detrimental amount of said recrystallization and/or growth occurs before the extrude can be quenched by these conventional methods and means to a temperature at which it does not occur. This results in a recrystallized extrude product having coarse grains and reduced strength and particularly a reduced compressive yield strength in the case of magnesium.

In extruding, for example, lead and its alloys, however, lower temperatures and pressures are permitted than with light metals. Therefore, the die relief cavity is normally flooded with a coolant such as water. This technique, however, is not suitable for metals which must be extruded at moderately high temperatures, such as for example, from about 600° F. to about 1100° F. such as with magnesium, because the die would be excessively chilled, thereby stopping the extrusion of metal altogether and/or breaking the die itself.

It would be desirable in the art, therefore, to be able to at least mildly quench extruded metals such as, for example, zinc, magnesium, aluminum and possibly copper, and alloys thereof, which are extruded at temperatures, for example, of from about 500° F. to about 1100° F., substantially as soon as said extrudes leave the die land to a temperature where recrystallization and/or grain growth do not detrimentally occur.

The principal object of the present invention, therefore, is to provide a forming member of an extrusion apparatus and method for mildly quenching extrudes of metals within the member itself, substantially immediately as said extrude leaves the working surface thereof, to a temperature where detrimental recrystallization and/or grain growth do not occur.

Another object of the invention is to provide a forming member as an extrusion die assembly for uniformly and mildly spray quenching magnesium extrudes in the die relief cavity thereof, by means of a number of successive stages of sprays adjacent the die lands thereof, as soon as the extrude leaves said die lands so as to delay recrystallization and/or grain growth to a temperature level where it no longer significantly occurs. A related object is to provide such a die which is readily and easily constructed.

A further object is to provide a novel multi-piece extrusion forming apparatus and a process for partially mildly spray quenching metal extrudes in successive stages within the forming apparatus itself, thereby to produce a fine grained extrude product. A related object is to provide such a process wherein said successive stages of sprays are applied to the extrude in the relief cavity of the forming apparatus.

Other objects and advantages of the invention will become more apparent as the description of the invention proceeds.

In general, the new and novel forming member of the present invention comprises an assembly of at least two parts or sections and preferably 3 or more, each section cooperating and mating with the others to provide a composite assembly having (a) one or more extrusion apertures of the desired cross section (forming the working surfaces or die lands thereof), (b) one or more internal cooling and coolant supply channels peripherally disposed and spaced around said aperture adjacent the die lands, and (c) a die relief cavity, preferably in substantial conformity to the cross section of the aperture, but in relief therefrom, and located adjacent said aperture in the direction of extrusion on a common longitudinal axis therewith and, (d) passageway communicating the channels with the cavity. At least one of said channels is adapted with an inlet and outlet for circulating a cooling media therethrough to cool the forming member and supply coolant to said passageways so as to quench the extrude. More specifically, the cooling channel or channels are in communication as aforesaid with the relief cavity of the forming member each by an array of substantially uniformly spaced stages comprising a plurality of relatively small, serrations, grooves or tubes and the like, called "passageways," disposed at an acute angle, and in most cases perpendicular to, the longitudinal axis of the aperture and cavity. The size of these passageways depends upon the cooling media or fluid employed. Through these passageways a controlled flow of cooling media, such as, for example, water is discharged or bled off from said channels onto the extrude preferably as a fine stream, flow, spray, mist or vapor to mildly and rapidly quench the extrude in successive stages immediately as it leaves the die lands. The cooling and supply channels themselves may be independent or they may be in communication. Also, as will be discussed more fully below, the present novel forming member in its broadest form may include a backer or support element, as shown in the figures, adapted with cooling channels and passageways constructed in cooling channels and passageways.

The invention will be more readily understood from a reading of the following detailed description with reference to the accompanying multifigured drawing showing specific embodiments of the broad invention wherein—

FIG. 1 is an isometric view of the sections of one embodiment of a forming member in accordance with the present invention, each section thereof being in its relative position for assembling and designated by the letters A,, B, and C.

FIG. 2 is a side elevational view, in section, of another forming member or die assembly in accordance with the present invention showing the center section thereof in a reversed position from that shown in FIG. 1 such that the cooling channel thereof is sealed off by the mating surface of the entry portion of the assembly.

FIG. 3 is an end view of the assembly of FIG. 2 looking from left to right.

FIG. 4 is a fragmentary view showing a plurality of center sections B in a particular arrangement in accordance with another embodiment of the apparatus of the present invention.

FIG. 5 is a fragmentary end view of another assembled forming member in accordance with the invention showing a different arrangement of passageways communicating the cooling channel of the assembly with the relief cavity thereof.

FIG. 6 is a fragmentary view of still another embodiment of an assembled forming member in accordance with the present invention showing a further arrangement of passageways communicating the cooling channel of the die with the relief cavity thereof.

Figure 7:
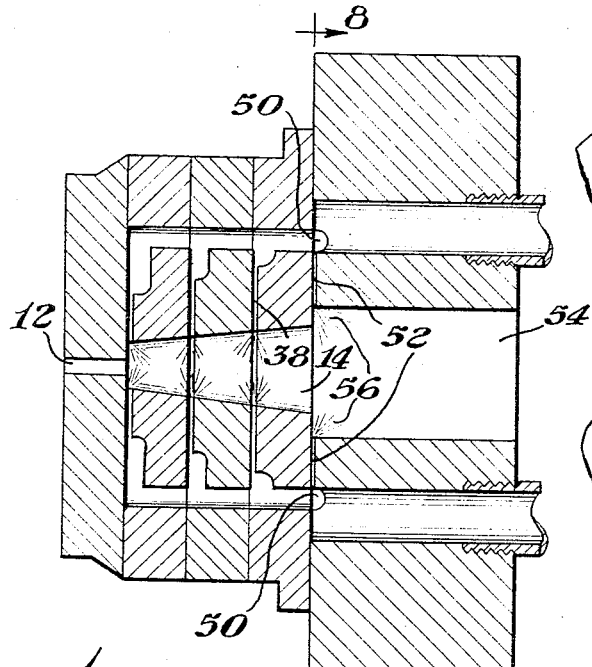
FIG. 7 is a side elevational view in section of a forming member of an extrusion press assembly in accordance with the present invention including a specially adapted backer or support element as it would be positioned and assembled upon being employed.

Referring now to the specific embodiment of the present invention shown in FIG. 1, the drawing is intended to illustrate a basic embodiment of the invention. It depicts a three piece forming member (called a die assembly) each element thereof being positioned for assembly, including from left to right, an entry portion or die section A, an intermediate section B, and an exit section C, each section of which will now be described in detail. This description is intended to be generally applicable to all embodiments of the present invention as will specifically be pointed out by reference to additional figures in the appended drawing along with explanations thereof.

ENTRY SECTION

Section A of the die or forming member as the entry section thereof comprises a disc of sufficient thickness (hereinafter defined) having an exposed side 10 against which an extrusion billet (not shown) is pressed during the extrusion process. Also contained in the entry section A is a continuous die land 12 or forming wall, centrally located and commencing perpendicularly from said exposed side 10 and extending into and through, or nearly so, the entire entry or die section A to form an extrusion aperture 14. As shown the entry section has threaded bores 16 and 16' adapted and positioned in conjunction with complementing bores in other sections of the assembly to receive bolts 18 and 18' (similarly as shown in FIG. 2) for holding and joining all or some of the sections of the forming member together as an assembly. It should be understood that these bores are located so as not to interfere with the other internal features of the die assembly. Holding means other than bolts may, of course, also be employed to retain the sections or portions as an assembly. The mating side 20 of the entry section A of the assembly (opposite the exposed side 10 of the entry section) is adapted to join or mate with the appropriate mating side 22 of an intermediate section B in a tight relationship therewith so as to seal the internal construction, for example, the channels, of the assembled die which will be discussed hereinafter. The circumferential shape of the entry portion A, though not critical, is such in conjunction with that of the other sections, including the backer element (when appropriate), to normally conform to the internal shape of e.g., the die holder in which the assembled die is normally seated and held during the extrusion operation.

INTERMEDIATE SECTION

The intermediate section B of the die as shown comprises the commencement of a cavity 24 in relief from the aperture (thus is called herein sometimes as a die relief cavity). This relief cavity continues as such on into the exit section C of the assembled die in line with the extrusion aperture 14 and even into a backer element when used. The relief cavity 24 may assume (but not necessarily) the cross-sectional shape of the aperture 14 but is larger in size so as to be in relief from said aperture to provide a space between the emerging extrude (not shown) and the wall 26 of the cavity. The amount of relief from the aperture is such as to be consistent with one of the purposes of the intermediate section of the die assembly in acting as a partial support for the entry section A which is under great stress during the extrusion operation. Moreover, the wall of the relief cavity 26 may proceed from the die land either in a straight line as shown, for example, in FIG. 2, in an outwardly flared manner as shown, for example, in FIG. 9, or in a stepped manner as shown, in FIG. 4.

Around said die relief cavity 24 and aperture 14 but annularly spaced substantially therefrom is a cooling channel 28 through which coolant, such as, for example, water, may be circulated. A coolant inlet port 30 and coolant outlet port 32 is provided in the exit section C to and from said channel, respectively, in cooperation with the entry section A of the assembly to accomplish this circulation. Appropriate coolant supply and discharge lines are provided accordingly (not shown). Also disposed within this intermediate section B are holes 34 and 34' adapted to receive the shank of the aforesaid retaining bolts. These holes, of course, are longitudinally in line with both their threaded counterparts 16 and 16' in the entry section A and with countersunk bolt holes 36 and 36' in the exit section C yet to be discussed. As shown more readily in FIG. 3, the cooling channel 28 communicates with the die relief cavity 24 and cavity wall 26 by means of a plurality of capillary-sized serrations, grooves, or the like 38, substantially spaced around the die relief 24 and adjacent the die lands 12 for uniform cooling of the emerging extrude. These grooves form tiny passageways from the channel to said cavity 24, when mating side 39 of the intermediate section B is joined with the interior mating of the exit section C or preferably with the interior mating side 20 of entry section A of the die assembly. These passageways are of such a size as to bleed off, for example, up to about 100 percent and preferably from about 20 to about 80 percent of the coolant from the channel 28 onto the extrude immediately as said extrude leaves the die lands 12. In certain cases it may be beneficial to bleed off all the coolant from the channels onto the extrude but normally on a portion as aforesaid will be bled off. When using water as a coolant, for example, the tiny grooves 38 are normally spaced apart a sufficient distance, for example, from $\frac{1}{32}$ to $\frac{1}{16}$ of an inch and are from, for example, 5 to 20 mils in depth or in cross-sectional size and are preferably tapered along their length toward the cavity so as to preferably form a spray or mist discharge therefrom to mildly quench the emerging extrude to the point where recrystallization is significantly minimized or no longer occurs. The size and location of the grooves, together with the line pressure and properties of the coolant may, of course, be varied to obtain proper cooling and quenching in accordance with the present invention, as may readily be determined, in view of the present specification, by those skilled in the art.

EXIT SECTION

Portion C of the assembly, that is, the exit section complements the shape and internal structure of the other sections of the assembly. In addition this section also serves as a support for section A of the die assembly, as does the aforementioned backer element for all sections of the die assembly. This exit portion comprises a continuation of the relief cavity 24 and coolant inlet 30 and outlet 32 ports. In addition, as aforesaid, countersunk bolt holes 36 and 36' are provided from the exposed side 42 of the exit section C to receive the retaining bolts hereinbefore discussed. The opposite, interior, mating side 44 of the exit portion is adapted to join tightly with the appropriate side 39 of an intermediate section B to finally seal the internal cooling channel structure of the assembled die or forming member save for the communication of said channels 28 with the cavity 24 by the passageways 38.

Though the accompanying drawing in FIG. 1 shows a basic die assembly arrangement having only one intermediate section B containing a single cooling channel 28 and a single stage or array of passageways 38, the present apparatus as aforesaid preferably includes and contemplates the use of a number of such intermediate sections and arrays of passageways, such as, for example, from about 3 to 6, of such sections and at least as many of said arrays.

Figure 9:
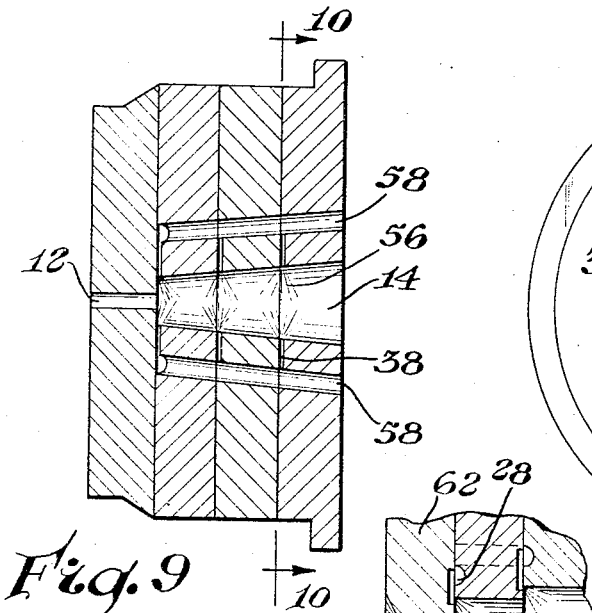
FIG. 9 is a side elevational view in section of another forming member or die assembly in accordance with the present invention showing central coolant supply channels as bores through which coolant is circulated with arrays of passageways leading from said bores at successive stages from the extrusion aperture and opening into the die relief cavity.

FIGS. 4, 7 and 9 show multiple cooling channels which may communicate with one another (FIG. 7) or be spaced apart (as shown in FIG. 7) and be separately supplied with coolant. It should be emphasized, however, that each cooling channel communicates with the relief cavity 24 by the arrays of said passageways 38 already described. Thus, when a plurality of said center sections B are employed, a number of stages or arrays of said passageways may be employed. Among other things this allows various liquid coolants to be used, or, if desired, a liquid coolant in one channel in conjunction with an air stream from another to direct, for example, said liquid coolant away from the die lands and onto the extrude, and so on.

It is manifest that the passageways 38 need not be made parallel to one another but may be made at various angles to one another as shown in FIG. 5. Moreover, it is generally desirable that the cooling passageways be constructed to provide a maximum contact area of coolant on the extrude. A fine spray or mist, therefore, instead of a solid stream is normally preferred. This is achieved by proper design of the said passageways as is known in the art. For example, the passageways may be constructed to cause two or more streams of coolant to impinge or converge at or just prior to their opening into the die relief cavity thereby causing the turbulent coolant atmosphere created to be applied over a large area of the emerging extrude. In addition, a spray or mist may also be created by varying the passageway dimensions to spread the stream transversely as by tapering them to a smaller diameter or cross section toward the die relief (shown in FIG. 4) and/or changing their dimensions longitudinally.

Figure 11:
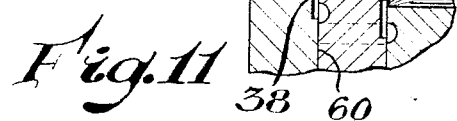
FIG. 11 is a fragmentary view, in section, of a die assembly in accordance with the present invention, showing the passageways communicating the cooling channels thereof with the die relief cavity constructed as grooves in the mating surface of a section of said assembly opposite the cooperating mating surface of the adjacent section carrying a cooling channel.

As aforesaid, the passageways may also be constructed as small grooves or serrations in the mating surface of a particular section opposite the mating surface carrying the cooling channel of an adjacent section. Such an arrangement is shown in FIG. 11 of the drawings. For example, when the grooves 38 are constructed in the mating surface of the entry section of the die assembly, that is, the section having the die lands therein. Thus when an adjacent intermediate section of the die assembly, having the cooling channel, is joined to the entry section, said grooves 38 will communicate the channel 28 with the die relief cavity 24 in a preferred manner such to spray coolant onto the extrude not only at the die land but also away from the lands.

Though not particularly preferred since it makes the center sections more difficult to construct, the grooves may alternatively be constructed as angled small holes or passageways 38 drilled in one intermediate section to communicate the cooling channel 28 of an adjacent intermediate section with the relief cavity 24. This is illustrated in FIG. 6. The passageway in this instance will be angled at less than 90 degrees from the longitudinal axis of the cavity so as to direct the spray away from the die lands 12 to avoid excess cooling thereof.

It is manifest from the foregoing, therefore, that the intermediate sections of the die can be modified and changed in a number of ways to obtain various cooling patterns and techniques without departing from the spirit or scope of the present invention. As a further example of this, the solid material between the cooling channel and die relief in any given intermediate section B of the die assembly may be constructed as a removable ring 64, as shown in FIG. 6. The ring may be held in place, for example, by locator pin and hole assemblies (not shown). In so doing, passageways 38 may be constructed on both sides to provide an increased number of arrays of said passageways thus more cooling or quenching capacity of the die.

In employing the present novel forming member, it is first assembled then placed in the header and die block of an extrusion press. Next the coolant lines are connected to the assembly supply line. Preferably the inlet line is equipped with a regulatory valve. In addition the coolant inlet is preferably equipped with a suitable filter. The filter should be of such size to prevent passage of particles large enough to bridge across and impede flow through the small grooves or passageways. The coolant outlet line which discharges the excess coolant not bled off through the aforesaid passageways is adapted to carry the coolant away for recycle. Recycle or reuse of coolant, however, is not normally done when water is used as the media. In addition, the outlet line may also be equipped with a valve to control proportion of coolant flowing through the passageway and channels. An extrusion billet of, for example, magnesium is inserted in the container of the extrusion press and stressed to die-express the billet through the die assembly. As desired, the billet may be extruded with or without first preheating. Normally, however, the billet is preheated to the container temperature and preferably higher. Shortly after extrusion begins, that is, after the billet has reached a speed or temperature high enough to prevent excessive chilling and stoppage, coolant is circulated through the assembly. Accordingly, all or a portion of the coolant is bled off and sprayed onto the emerging extrude by means of the passageways as the extrude leaves the die lands.

Figure 8:
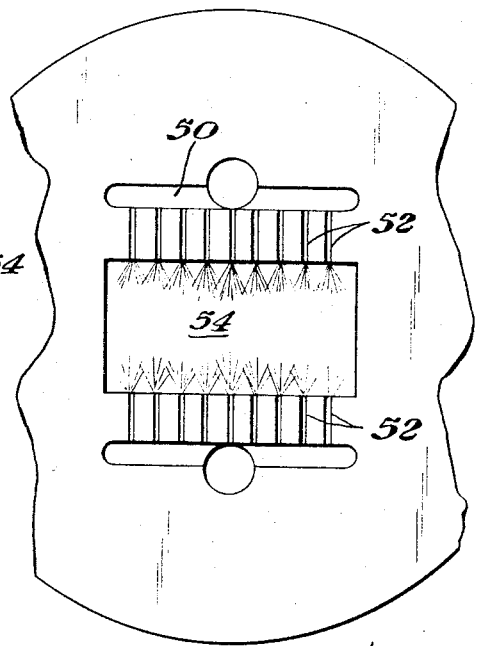
FIG. 8 is a plan view of FIG. 7 taken along line 8—8.

When using the backer element described hereinbefore as part of the present novel forming member, it may be provided with one or more independent or connected central coolant supply grooves 50, such as shown in FIGS. 7 and 8 with an array of passageways 52 communicating it with the throat 54 of the press to further quench the emerging extrude with coolant as it leaves the die relief cavity.

Figure 10:
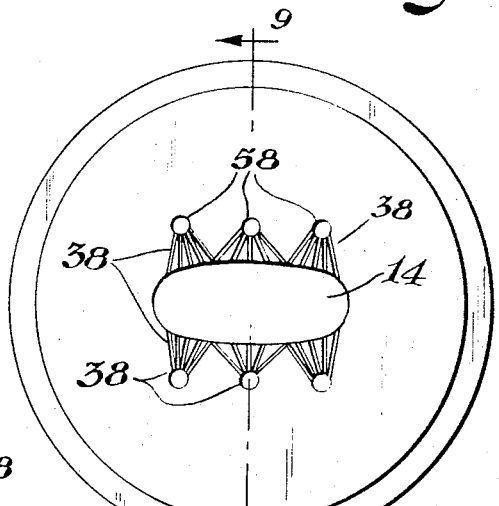
FIG. 10 is a plan view of one part of FIG. 9 taken along line 10—10, showing a plurality of the channels with an array of passageways leading from each bore and opening into the relief cavity.

A method which may be used to give the die assembly added strength so as to avoid cracking at the aperture 12 is to provide one, or more large diameter bores 58, for example, from about ⅛ to about ¼ inch in diameter, longitudinally disposed around but spaced from the aperture 12 and cavity 14. This is shown in FIGS. 9 and 10.

Inasmuch as a great stress is placed on the entry section of a forming member of the present invention in the direction of extrusion, the section may be transversely flexed very slightly but enough to slightly distort the parallelism between the walls in a given aperture. Accordingly, to compensate, said walls may be machined very closely in the opposite transverse direction to the stress so as to render the aperture walls essentially perfectly parallel when the entry section is under stress during extrusion. Said walls therefore would not be perfectly parallel when the section is not under the stress of extrusion.

If desired, the aperture walls may be further machined to provide at least a minimum choking affect in thereto to permit washing of the metal in the aperture to avoid recrystallization and grain growth prior to the metal leaving the die land.

For more controlled cooling of the die, any or all of the surface areas may be provided with a thin coating, such as, for example, from 1 to 10 mils in thickness, of an insulating material such as aluminum oxide. Such surface area to be so-coated may include, for example, those in contact with coolant, and also the mating surfaces of the various portions throughout the assembly.

In the extrusion of hollow shapes, such as, for example, a tube, it may be desirable to provide quenching on the inside as well as on the outside of the tubular extrude. An apparatus or forming member, in accordance with the present invention, may comprise, for example, an assembly defining a first continuous wall die land adapted to form or shape the outside surface of a tubular shape, and a second continuous wall die land disposed internally about the first die land, and spaced therefrom, for forming the internal wall of the tubular extrude. In relief from both die land walls is a longitudinally adjacent cavity. Externally circumferentially disposed about and spaced from the outer wall thereof is at least one cooling channel communicating with said cavity by at least one array or stage of passageways as hereinbefore described. Also internally disposed about the cavity but spaced from the internal wall thereof is at least one channel in a mandrel. This channel is in communication with the cavity by at least one array or stage of a multiplicity of passageways which bleed off up to 100 percent of the coolant from the channel on to the extrude. This mandrel is in communication with coolant lines for receiving and discharging cooling media. In any event, this forming member or die assembly embodies the basic features of the present inventive apparatus.

It is understood that in the forming member apparatuses described herein, the number of quenching stages in the intermediate sections, the number of passageways, their location, and the amount of water impinged on the extrude, to mention some of the factors to be considered, will in general be determined by the shape of the extrude being formed and the degree of temperature drop desired in the extrude. For example, these will be increased where a greater temperature drop is desired such as when extruding at high temperatures and/or extrusion speeds.

By means of this novel forming apparatus, therefore, quenching of, for example, magnesium extrudes is accomplished within the die relief cavity by means of one or more arrays or stages of sprays or the like as opposed to outside by a separate apparatus at a relatively remote distance from the die. The quenching action, therefore takes place at the earliest possible point, that is, immediately as the extrude leaves the die land. As a result, recrystallization and/or grain growth are delayed in the emerging extrude until said extrude reaches a temperature, for example, from about 300° to about 700° F., where it no longer occurs. In so doing, fine grain or unrecrystallized, high strength extruded articles can be prepared which were heretofore unobtainable in like quality from conventional extrusion and quenching apparatus. Moreover, the present novel forming member is adapted for easy construction since the serrations or grooves are located on the flat mating surfaces of the intermediate sections B, thus making them readily amenable to machining. Moreover, the present novel apparatus may be employed in conjunction and cooperation with, for example, a backer element for support which in addition has provided or adapted with cooling channels and passageways.

The following examples further illustrate the present invention but are not to be construed as limiting the invention thereto.

*Example I*

To illustrate the invention and the improved properties obtained when using the present novel forming member as a die assembly, various magnesium base alloy billets were extruded in a press at certain speeds and temperatures using an apparatus constructed and employed in accordance with the invention. The die assembly was constructed similarly to that shown in FIG. 1 of the accompanying drawing, with the intermediate portion B of the die being positioned so that the aforesaid passageways formed by the assembly communicated the cooling channel with the relief cavity immediately at the end of the die land as shown in FIG. 2. The intermediate portion (B) of the single apertured die assembly contained 84 grooves, plus three grooves along each of the short sides. Each groove as a passageway, being about 5 mils deep, was cut into the mating surface of the entry section A opposite the mating surface of the intermediate section (B), and positioned in such a manner as to communicate the cooling channel of the assembly with the die relief cavity thereof. The grooves were machined about ½₂ inch apart. Extrusion was then started, whereupon, the water flow through the cooling channel was maintained at a line pressure of about 80 p.s.i.g. Flow through the passageways was about 5 pounds per minute with about 14.5 pounds per minute going through the exit line. About 25 percent by volume (about 5 pounds per minute water flow) of the water coolant was bled off from the cooling channel through the passageways and onto the extrude as said extrude (⅛ x 1¼ inches) left the die lands. For purposes of comparison or control, some billets were extruded without circulating coolant through the die or bleeding off coolant through the passageways.

The extrudes produced were then machined into test bars and tested for percent elongation (percent E), tensile yield strength (TYS), compression yield strength (CYS), and tensile strength (TS), with the results being recorded in Table I below along with the temperature of extrusion, exit temperature of the extrude and extrusion speed:

TABLE I

| Alloy* | Extrusion Container Temp., °F. | Speed, f.p.m. | Without Quenching | | | | | With Quenching | | | | |
|---|---|---|---|---|---|---|---|---|---|---|---|---|
| | | | Percent E | TYS | CYS | TS | Extrude Temp., °F. | Percent E | TYS | CYS | TS | Extrude Temp., °F. |
| AZ10 | 700 | 40 | 12 | 25 | 12 | 37 | | 13 | 27 | 14 | 38 | 790 |
| (P)HM42 | 900 | 30 | 10 | 17 | 17 | 28 | 1,080 | 6 | 32 | 32 | 37 | 940 |
| (P)ZK10 | 650 | 40 | 5 | 36 | 20 | 42 | 850 | 5 | 41 | 25 | 44 | 790 |
| (P)ZK10 | 750 | 40 | 6 | 29 | 11 | 37 | 960 | 6 | 39 | 19 | 44 | 800 |
| (P)ZK10 | 850 | 40 | 6 | 29 | 11 | 37 | 1,000 | 5 | 40 | 17 | 44 | 820 |
| (P)EK31 | 800 | 40 | 8 | 19 | 18 | 27 | 870 | 7 | 27 | 25 | 33 | 840 |
| (P)ZK60 | 650 | 20 | 11 | 35 | 37 | 47 | 850 | 13 | 42 | 44 | 53 | 600 |

*ASTM Nomenclature. (P) Indicates alloy in pellet form.

The grain size of both the extrusion butts (discards) and of the test bars prepared from the extrusion produced were in addition examined metallographically. In each case, the grain size was significantly finer in the extrudes which were mildly quenched than in the extrudes produced without the mild quenching provision of the present invention. Thus, from a comparison of the values in Table I it is clear that the properties are significantly greater for the extrudes mildly quenched in accordance with the present invention than for the extrudes produced without mild quenching.

*Example II*

A die assembly having three intermediate sections was constructed in accordance with the invention containing three quenching stages (that is, three arrays of passageways one in each of three intermediate sections together with independent cooling channels) similar to that shown in FIG. 4. DC cast AZ31B alloy billets were extruded at 80 f.p.m. at a temperature of about 800° F. Coolant (water) flow was set at about 17 pounds per minute through the passageway and about 5 pounds per minute through the coolant exhaust. The coolant channel in each section was about 0.25 deep by 0.25 inch wide with about 40 passageways communicating each channel with the relief cavity. The extrudes (1/16 x 1¼ inches in size) so-obtained were cut into test samples and tested at room temperature for percent elongation (percent E), tensile yield strength (TYS), compression yield strength (CYS), and tensile strength (TS), with the results presented in Table I, column I. These test results are compared in column II of the table with the same properties typically obtained from AZ31B alloys (controls) but which were not extruded through the present forming apparatus nor by the present process:

TABLE I

| Property | I (Examples) | II (Controls) |
|---|---|---|
| Percent E (in 2 inches) | 12 | 14 |
| TYS (lbs./in.²) | 34,000 | 28,000 |
| CYS (lbs./in.²) | 26,000 | 14,000 |
| TS (lbs./in.²) | 44,000 | 38,000 |

The dramatic improvement in the strength properties of the AZ31B alloy in column I of Table II extruded through the present die, and particularly the improvement of CYS, over those of the same alloy (controls) not treated or processed in the same manner, is attributable to the fine grain size brought about by the present novel die assembly and method.

Other embodiments of the present invention may be employed and included those apparatuses wherein at least one cooling channel is disposed within an assembly either externally or internally about a relief cavity in a spaced relationship therewith and being only in communication with said cavity by one or more arrays or stages each comprising a multiplicity of spaced passageways, as described hereinbefore.

The present invention may be modified or changed without departing from the spirit or scope thereof and it is understood that the invention is only limited as defined in the appended claims.

I claim:

1. A forming member of an extrusion apparatus which comprises: (a) an assembly having die lands defining an extrusion aperture partially longitudinally therethrough; (b) a cavity longitudinally adjacent and in relief from said aperture; (c) at least one cooling channel disposed about said cavity in a spaced relationship thereto and also spaced from said aperture; (d) inlet and outlet means for said channel; and (e) at least one stage of an array of relatively small passageways disposed about the cavity communicating said cavity with said channel adjacent to the die lands.

2. The forming member of claim 1 wherein there is at least three longitudinally spaced stages of passageways communicating the channels with the relief cavity.

3. The forming member of claim 1 wherein the small passageways of each array communicating the channel with the relief cavity each have a decreasing cross sectional area along their length from said channel to said relief cavity.

4. The forming member of claim 1 wherein at least two of the small passageways in each array communicating the channel with the relief cavity converge at their communication with the relief cavity.

5. The forming member of claim 1 wherein the inlet and outlet for all the channels is common.

6. The forming member of claim 1 wherein the aperture is choked in the direction of extrusion.

7. An extrusion die assembly comprising:
(1) a first die section defining an extrusion aperture through and by which metal is extruded and formed, said section having an exposed exterior face and an opposite interior surface adapted to be mated to an intermediate section of the assembly;
(2) at least one intermediate section defining a die relief cavity, the face of said intermediate section adjacent said first die section mating with the interior surface of said first die section and positioned such that the die relief cavity is disposed adjacent the extrusion aperture of said first die section on a common longitudinal axis therewith, each of said intermediate sections being rigidly attached by holding means to other section of said assembly, said die relief cavity having disposed thereabout in a spaced relationship at least one channel capable of being closed off from said die relief cavity by a joining of two sections of the assembly, each of said channels being adapted with an inlet and outlet means, and each being in communication with at least one stage of an array of relatively small passageways annularly disposed around the relief cavity near the aperture communicating said channels with the relief cavity;
(3) a final section adjacent an intermediate section defining the termination of said die relief cavity and having an inlet port and outlet port corresponding to the inlet and outlet means in at least one intermediate section, said final section having an exposed exterior face opposite that of the first section, and an interior surface adapted to be mated with a cooperating surface of an intermediate section.

8. The die assembly of claim 7 wherein each intermediate section is equipped with at least one array of relatively small passageways disposed perpendicular to the longitudinal axis of the cavity.

9. The die assembly of claim 7 wherein all the sections of the assembly are of about the same longitudinal thickness.

10. The extrusion die assembly of claim 7 wherein the first die section comprises in addition an array of spaced grooves in said interior surface, said grooves being perpendicular to the aperture, each groove being positioned as to be substantially closed when said first die section is joined with other sections leaving only an inlet port thereinto and an outlet port therefrom.

11. An extrusion die assembly comprising, a first die section, at least one intermediate section and one final section, all the die sections in the assembly being of about the same thickness in the direction of extrusion, (a) said first die section defining an extrusion aperture, said die section having (1) an exposed exterior face substantially perpendicular to the direction of extrusion, (2) an opposite interior surface adapted to be mated to other sections of the assembly, and (3) an array of spaced grooves as passageways in said interior joinable surface, said grooves being essentially perpendicular to the aperture and being positioned as to be substantially closed when the first die section is joined with other sections of the assembly but providing an inlet port thereinto and an outlet port therefrom; (b) each of said intermediate sections defining at least a portion of a relief cavity, said cavity being disposed adjacent the aperture on a common longitudinal axis therewith, each intermediate section being attached and positioned by holding means to a cooperating interior surface of an intermediate section in complement therewith, the die relief cavity having disposed around it in a spaced relationship at least one cooling channel capable of being substantially closed by a joining of two sections of the assembly but in communication with the grooves in said first die section each of said channels being in communication with a common coolant inlet and outlet means and with the die relief cavity by means of the otherwise closed grooved passageways in said first die section; and (c) said final section defining the termination of said die relief cavity and having an inlet port and an outlet port in correspondence to the common inlet and outlet means, said final section having an exposed exterior surface opposite that of the first die section, and an interior joinable surface adapted to be mated with other sections of the die assembly.

12. A method of extruding which comprises:
(a) providing an extrusion machine containing a forming member assembly comprising an entry section, at least one intermediate section, and an exit section, said assembly having die lands defining at least one extrusion aperture partially longitudinally therethrough, a relief cavity longitudinally adjacent and in relief from said aperture, at least one closed cooling channel disposed about said cavity in a spaced relationship thereto and spaced from said aperture, inlet and outlet means for said channel and, at least one stage of an array of passageways disposed about the cavity communicating said cavity with said channel adjacent to the die lands;
(b) extruding the alloy through said member;
(c) circulating a cooling media through the channel of said forming member during the extruding of said alloy;
(d) bleeding off through said passagweays at least a portion of the cooling media circulating through said channel; and
(e) discharging said portion of cooling media through said passageways onto the extruded alloy as the extrude emerges, leaves the die lands, and enters the relief cavity, thereby rapidly and mildly quenching said extrude.

13. The method of claim 12 wherein the aperture of the forming member of step (a) is choked in the direction of extrusion to minimize working of the alloy being extruded until the alloy leaves the die lands.

14. The method of claim 12 wherein the alloy to be extruded is a magnesium base alloy.

15. The process of claim 12 wherein the forming member provided in step (a) comprises at least three intermediate sections, each such section providing at least one array of said passageways.

16. The process of claim 12 wherein the extrude is mildly quenched to a temperature within the range of from about 300° to about 700° F.

References Cited

UNITED STATES PATENTS

| | | | |
|---|---|---|---|
| 2,002,690 | 5/1935 | Carter | 72—268 |
| 2,252,365 | 8/1941 | Fisher | 72—286 |
| 2,385,574 | 9/1945 | Hyprath | 72—268 |
| 3,181,337 | 5/1965 | Foerster | 72—342 |

RICHARD J. HERBST, *Primary Examiner.*

H. C. DECKER, *Assistant Examiner.*